(12) United States Patent
Cox, Jr.

(10) Patent No.: US 7,108,183 B1
(45) Date of Patent: Sep. 19, 2006

(54) VERIFICATION SYSTEM FOR THE PURCHASE OF A RETAIL ITEM AND METHOD OF USING SAME

(76) Inventor: David W. Cox, Jr., 1401 E. Ash, Springfield, IL (US) 62703

( * ) Notice: Subject to any disclaimer, the term of this patent is extended or adjusted under 35 U.S.C. 154(b) by 64 days.

(21) Appl. No.: 09/781,755

(22) Filed: Feb. 12, 2001

(51) Int. Cl.
*G06K 7/10* (2006.01)
*G06F 17/60* (2006.01)

(52) U.S. Cl. ................... 235/462.01; 235/385

(58) Field of Classification Search .......... 235/462.01, 235/462.05, 462.14, 462.25, 375, 381, 385
See application file for complete search history.

(56) References Cited

U.S. PATENT DOCUMENTS

| | | | | |
|---|---|---|---|---|
| 3,719,262 A | * | 3/1973 | Taplin | 197/17 |
| 3,774,014 A | * | 11/1973 | Berler | 235/262.01 |
| 4,186,020 A | * | 1/1980 | Wachtel | 106/22 |
| 4,514,085 A | | 4/1985 | Kaye | 356/71 |
| 5,064,221 A | | 11/1991 | Miehe et al. | 283/67 |
| 5,109,153 A | * | 4/1992 | Johnsen et al. | 235/468 |
| 5,118,349 A | | 6/1992 | Jalon | 106/21 |
| 5,120,088 A | | 6/1992 | Radcliffe et al. | 283/67 |
| 5,209,513 A | | 5/1993 | Batelli et al. | 283/67 |
| 5,278,396 A | * | 1/1994 | McGaha | 235/432 |
| 5,289,547 A | | 2/1994 | Ligas et al. | 382/7 |
| 5,360,628 A | | 11/1994 | Butland | 427/7 |
| 5,367,148 A | * | 11/1994 | Storch | 235/375 |
| 5,406,063 A | * | 4/1995 | Jelen | 235/472.01 |
| 5,450,190 A | | 9/1995 | Schwartz et al. | 356/71 |
| 5,502,304 A | | 3/1996 | Berson et al. | 250/271 |
| 5,516,590 A | | 5/1996 | Olmstead et al. | 428/484 |
| 5,568,177 A | * | 10/1996 | Talvalkar et al. | 347/217 |
| 5,602,377 A | * | 2/1997 | Beller et al. | 235/462 |
| 5,644,352 A | * | 7/1997 | Chang et al. | 347/221 |
| 5,838,814 A | | 11/1998 | Moore | 382/115 |
| 5,873,604 A | | 2/1999 | Phillips | 283/70 |
| 5,925,865 A | * | 7/1999 | Steger | 235/379 |
| 6,016,480 A | * | 1/2000 | Houvener et al. | 235/380 |
| 6,078,682 A | | 6/2000 | Tanioka et al. | 382/135 |
| 6,213,397 B1 | * | 4/2001 | Rando | 235/454 |
| 6,226,619 B1 | * | 5/2001 | Halperin et al. | 705/1 |
| 6,270,724 B1 | * | 8/2001 | Woodaman | 422/58 |
| 6,830,083 B1 | * | 12/2004 | Hollub et al. | 141/65 |
| 6,830,181 B1 | * | 12/2004 | Bennett | 235/440 |
| 2004/0088230 A1 | * | 5/2004 | Elliott et al. | |

FOREIGN PATENT DOCUMENTS

DE 2844242 A * 4/1980

* cited by examiner

*Primary Examiner*—Daniel Stcyr
(74) *Attorney, Agent, or Firm*—Ryndak & Suri LLP

(57) ABSTRACT

The present invention provides a system and method for the verification of the purchase of a retail item wherein an encoding device provides a machine-readable post-purchase indicia on the label for a retail item at the point of sale of the retail item. When a customer returns the retail item for a refund or exchange, a detecting device analyzes the label for the presence of the post-purchase indicia. Presence of the post-purchase indicia indicates a legitimate exchange whereas the absence of the post-purchase indicia signifies a fraudulent exchange.

29 Claims, 1 Drawing Sheet

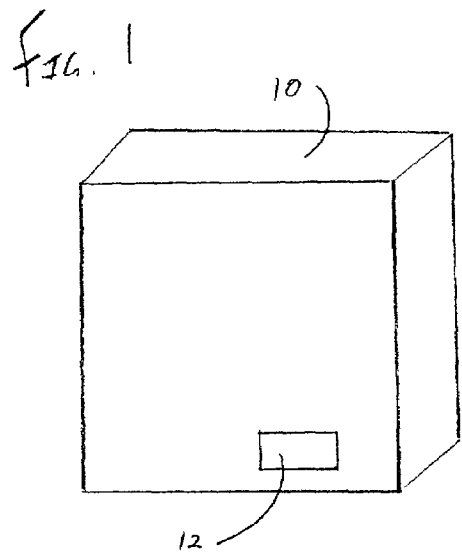
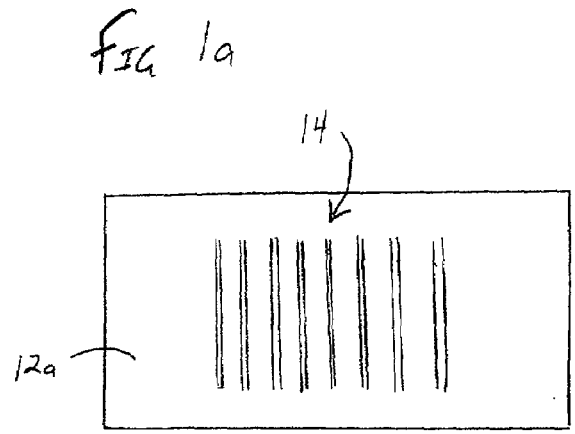
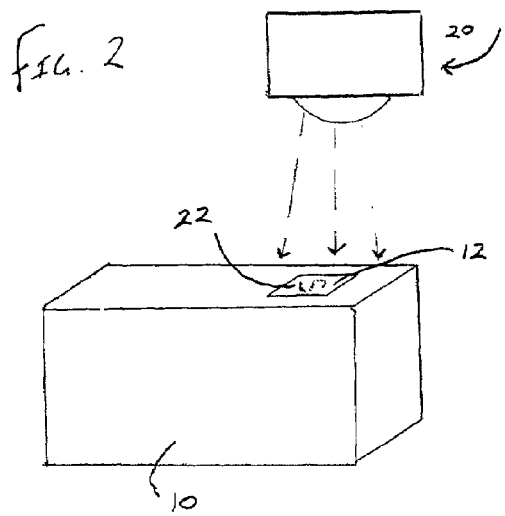
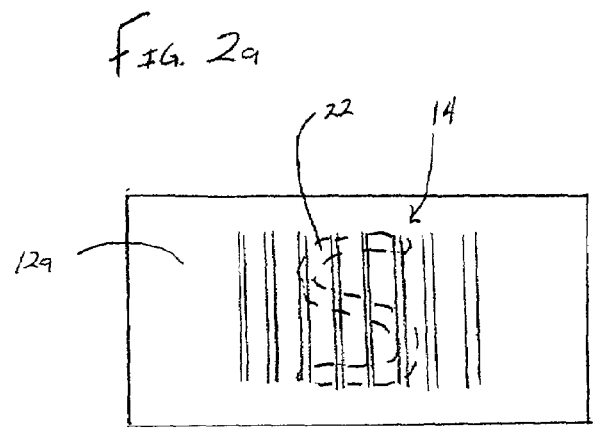
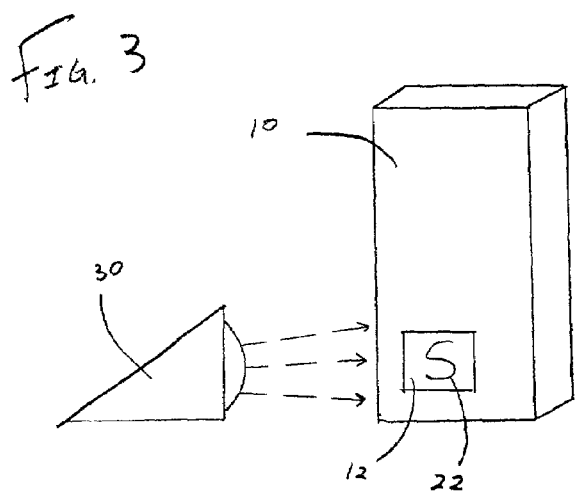
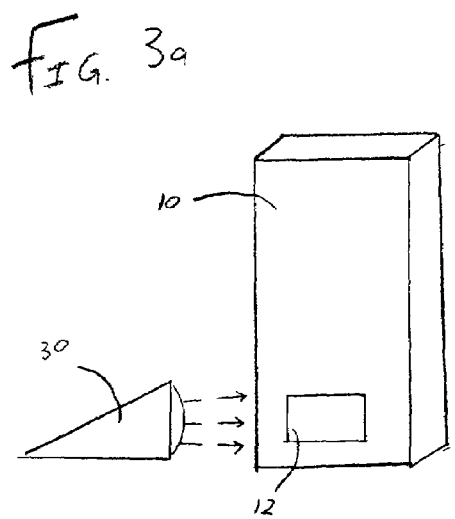

VERIFICATION SYSTEM FOR THE PURCHASE OF A RETAIL ITEM AND METHOD OF USING SAME

FIELD OF THE INVENTION

The invention relates to a system and method for verifying the legitimate purchase of a retail item and, in particular, to a system and method for providing a machine-readable post-purchase indicia on a retail item label and subsequently detecting the indicia when the retail item is presented for a refund or exchange.

BACKGROUND OF THE INVENTION

Retailers suffer shoplifting losses that are in the billions of dollars each year. Countless surveillance and electronic security methods are known to prevent or reduce the incidence of shoplifting in retail venues such as shopping malls, boutique shops and discount or warehouse outlets. Although effective, these preventative measures do little to protect the retailer from secondary shoplifting schemes—skullduggery performed once the merchandise has been shoplifted from store premises.

With the profusion in anti-shoplifting technology, shoplifting techniques have correspondingly grown savvier. A common practice is for the shoplifter or a confederate to return a shoplifted item to a store or sister store in a retail chain for a cash refund, store credit or exchange. As items are often given as gifts, many retailers will provide a cash refund, store credit or exchange without a sales receipt if the merchandise carries an untampered price tag identifying the store.

Another deceptive practice is to purchase a retail item at a discount store and return the item at a more sophisticated department store for a cash refund or store credit greater than the purchase price. Many retailers have difficulty verifying that a merchandise item was sold at one of their stores. Retailers are oftentimes deterred from placing store labels on products as consumers have demonstrated a reluctance in purchasing items as gifts wherein the product carries excessive printing.

A need therefore exists for a system and method of verifying that an item has been legitimately purchased to prevent fraudulent cash refunds, store credit or exchanges on returned retail merchandise. A need subsequently exists for a system and method to identify the specific store in which a particular merchandise item was purchased.

SUMMARY OF THE INVENTION

The present invention provides a system and method to verify the legitimate purchase of a retail item by a customer. In accordance with the present invention, the system provides a label associated with the retail item, wherein the label lacks a machine-readable post-purchase indicia; a point of sale encoding device provides a machine-readable post-purchase indicia on the label when the label is scanned during purchase by the customer; and a detecting device subsequently analyzes the label to determine whether the machine-readable post-purchase indicia is present when the customer returns the item for an exchange, store credit or refund.

In accordance with another embodiment of the present invention, indicia is machine readable only or otherwise invisible to the human eye.

In accordance with another embodiment of the present invention, the encoding device provides the machine-readable post-purchase indicia photochromically, thermalchromically, magnetically, electro-magnetically, optically, electro-optically, holographically, electrically and via radiofrequency.

In accordance with another embodiment of the present invention, the label may be multi-layered and the composition of the label is selected from the group consisting of paper, plastic, photochromic material, thermalchromic material, magnetic material, electrically conductive material, holographic material, a microprocessor, a microchip or a memory chip.

In accordance with another embodiment of the present invention, the label is a bar code.

In accordance with another embodiment of the present invention, a refund for the retail item is conditioned upon the detection of the machine-readable post-purchase indicia by the detecting device.

In accordance with another embodiment of the present invention, the detecting device removes the machine-readable post-purchase indicia from the label after a refund is given to customer.

In accordance with another embodiment of the present invention, the machine-readable post-purchase indicia identifies the store, the date and time of purchase and the method of payment for the sold retail item.

BRIEF DESCRIPTION OF THE DRAWINGS

FIG. 1 is a side view illustrating a label attached to a retail item in accordance with the present invention;

FIG. 1a is a perspective view of a specific embodiment of the label in accordance with the present invention;

FIG. 2 is a block diagram showing the provision of the machine-readable post-purchase indicia by the encoding device in accordance with the present invention;

FIG. 2a is a perspective view of a specific embodiment of the label with machine-readable post-purchase indicia thereon in accordance with the present invention;

FIG. 3 is a block diagram illustrating the detecting device determining a valid refund in accordance with the present invention;

FIG. 3a is a block diagram depicting the detecting device determining a fraudulent refund in accordance with the present invention.

DETAILED DESCRIPTION OF THE PREFERRED EMBODIMENTS

Referring to the Figures generally, where like reference numerals denote like structure and elements, and in particular to FIG. 1 wherein retail item 10 is depicted with label 12 affixed thereto. Label 12 can be a price tag attached to retail item 10 by any suitable means such as by string, tape or staple. Alternatively, label 12 can be integral to the packaging of retail item 10. Preferably, label 12 is adhesively attached to retail package 10 as shown FIG. 1.

In a specific embodiment of the present invention, bar code 14 extends across at least a portion of label 12a as shown in FIG. 1a. Bar code 14 operates in conjunction with a bar code reading system or scanner wherein a light beam directed across the bar code is reflected and collected by a scanner as is known in the art. Label 12a is produced from a material that does not interfere with the bar code scanning system as is known in the art.

When a customer brings retail item 10 to the point of sale in a retail facility—typically, a checkout counter or a sales register—encoding device 20 is used to provide a machine-readable post-purchase indicia 22 onto label 12 as shown in FIG. 2. Indicia 22 can be any desired shape, marking, or other data that designates the legitimate purchase of retail item 10. Alternatively, machine-readable post-purchase indicia 22 may entail label 12 having no indicia thereon. In this situation, encoding device 20 removes a pre-purchase marking located on label 12 at the point of sale. The advantage of providing post-purchase indicia 22 on label 12 is that if retail item 10 is stolen, shoplifted, or fraudulently acquired by other means, label 12 will not carry machine-readable post-purchase indicia 22 thereon.

FIG. 2a depicts a specific embodiment of the present invention wherein indicia 22 is provided on label 12a having bar code 14 thereon. Post-purchase indicia 22 is an "S," drawn in phantom as it is machine readable, denoting that retail item 10 was legitimately sold. It is to be understood that the provision of indicia 22 by encoding device 20 does not interfere with the operation of the bar code scanning system. This is accomplished by choosing a compatible technology or non-interfering energy wavelength for encoding device 20.

The present invention utilizes any method, system or technology that has the capability to place a machine-readable post-purchase indicia 22 on label 12 at the point of sale of a retail item as is known to the skilled artisan. Such methods may include, but are not limited to, photochromic, thermalchromic, magnetic, electromagnetic, optical, electro-optical, electrical, or radiofrequency technologies.

Correspondingly, label 12 and encoding device 20 operate in conjunction with each other with label 12 appropriately responding to the technology employed by encoding device 20. For example, application of photochromic technology would entail label 12 having a chemical compound capable of undergoing a reversible change in color after being irradiated with the necessary energy by encoding device 20 thereby providing indicia 22. Likewise, use of thermalchromic technology requires label 12 to consist of a chemical compound that undergoes a reversible change in color after exposure to the requisite temperature provided by encoding device 20 to form indicia 22 on label 12.

Provision of magnetic or electromagnetic technology in the present invention requires label 12 to comprise a magnetic strip or magnetic layer with encoding device 20 having a magnetic head to alter the polarity of the magnetic strip of label 12 thereby providing indicia 22. Application of optical or electro-optical technology in the present invention entails encoding device 20 to direct a laser, light emitting diode or other light source onto a photosensitive label 12 thereby creating indicia 22. Label 12 may consist of a convertible hologram that is converted into indicia 22 upon irradiation of the requisite energy by encoding device 20. Use of radiofrequency in the present invention requires label 12 to comprise a small semiconductor, microprocessor or memory chip and encoding device 20 to have a radiofrequency transponder capable of transmitting an indicia 22 to the semiconductor, microprocessor or memory chip of label 12. An electrical embodiment is also possible wherein label 12 comprises an electro-conductive layer and encoding device 20 sends an electronic signal through a plurality of electrodes or other means to provide indicia 22 on label 12. These and other technologies known to those skilled in the art can preferably be modified with minimal effort to operate simultaneously and not interfere with a bar code scanning system.

Label 12 may be a single layer or a plurality of layers suitably adapted to appropriately manifest or carry a machine-readable post-purchase indicia 22 when operating in conjunction with the technology utilized by encoding device 20 as known to the skilled artisan. As such, label 12 may be constructed of, but is not limited to, paper, plastic, magnetic material, electrically conductive material, holographic material, photochromic compounds, thermalchromic compounds, microprocessors, microchips or memory chips. When label 12 comprises a plurality of layers, the layers may conceal and/or secure a microchip, semiconductor, memory chip, electrically conductive strip or magnetic strip when such technology is utilized by the present invention.

In an alternate embodiment of the present invention, indicia 22 is machine readable only and is not discernible by the human eye. This may be provided by utilizing magnetic, electromagnetic, optical, electro-optical, electrical, or radiofrequency technology that is machine discernible only, for example. Alternatively, photochromic and thermalchromic compounds invisible in the visible light spectrum but machine discernible in such non-visible light spectra as far-red, infrared and ultraviolet spectra may also be used.

Preferably encoding device 20 provides a machine-readable post-purchase indicia that also identifies the store where purchase of retail item 10 was consummated. Other information conveyed by indicia 22 may include the time and date of purchase of retail item 10, the purchaser's name and address, and payment means—cash, check or credit card.

When a customer returns retail item 10 to the retail facility for a refund or exchange, retail item 10 is taken to detecting device 30 typically located at a refund or exchange counter. Detecting device 30 then analyzes label 12 to determine whether post-purchase indicia 22 is present. When detecting device 30 determines that post-purchase indicia 22 is present, this signifies that the customer legitimately purchased retail item 10 and a refund or exchange may be granted as shown in FIG. 3. In the event detecting device 30 does not detect the presence of post-purchase indicia 22 on label 12, a fraudulent attempt for a refund has occurred. In this situation, retail item 10 may be confiscated from the customer and the refund or exchange may be denied. FIG. 3a illustrates detecting device 30 determining that post-purchase indicia 22 is not present on label 12.

Any system, method or technology known to the skilled artisan that can identify machine-readable post-purchase indicia 22 provided by encoding device 20 may be utilized by the present invention. Preferably, detecting device 30 employs the same technology as encoding device 20. For example, detecting device 30 applies the requisite radiation to view indicia 22 when photochromic or thermalchromic technology is used. Detecting device 30 comprises a magnetic reader suitably adapted to decipher magnetic indicia 22 on label 12 when encoding device 20 comprises a magnetic head. Detecting device 30 comprises an optical detector capable of discerning whether indicia 22 is present when indicia 22 was optically formed on label 12 by encoding device 20. Detecting device 30 comprises a radiofrequency detector capable of detecting a radiofrequency indicia 22 on a semiconductor, microchip or memory chip on label 12 wherein encoding device 20 comprises a radiofrequency transponder. Detecting device 30 comprises an electronic detector capable of discerning whether encoding device 20 provided an electrical indicia 22 on label 12.

In an alternate embodiment of the present invention, detecting device 30 has the capability to remove machine-readable post-purchase indicia 22 after a refund or exchange is given to the customer. This enables retail item 10 to be quickly restocked for future purchase.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A system for verifying the purchase of a retail item by a customer comprising:
   a label associated with the retail item, said label lacking a post-purchase machine-readable indicia;
   a point of sale station having a point of sale encoding device, said encoding device providing a machine-readable post-purchase indicia associated with the label during purchase by the customer; and
   a return station at a different location from a location of the point of sale station and having a detecting device for analyzing the label to determine whether the post-purchase machine readable indicia is present.

2. The system of claim 1 wherein said post-purchase machine-readable indicia is machine readable only.

3. The system of claim 1 wherein said post-purchase machine-readable indicia is invisible.

4. The system of claim 1 wherein said post-purchase machine-readable indicia is visible when radiated with far-red, infrared or ultraviolet radiation.

5. The system of claim 1 wherein said encoding device provides said machine-readable indicia photochemically, thermalchromically, magnetically, electro-magnetically, optically, electro-optically, holographically, electrically or via radiofrequency.

6. The system of claim 5 wherein said encoding device is a radiofrequency encoding device.

7. The system of claim 6 wherein the post-purchase machine-readable indicia of the label is detectable by radiofrequency.

8. The system of claim 7 wherein the detecting device is a radiofrequency detecting device.

9. The system of claim 6 wherein said encoding device produces said post-purchase machine-readable indicia by radiofrequency.

10. The system of claim 9 wherein said label comprises at least one of a semiconductor, a microprocessor, and a memory chip for storing said radiofrequency produced indicia.

11. The system of claim 10 wherein said detecting device for analyzing the label to determine whether the post-purchase machine-readable indicia is present comprises a radiofrequency detector capable of detecting said radiofrequency indicia on said label.

12. The system of claim 9 wherein the label comprises a plurality of layers to conceal the at least one of a semiconductor, a microprocessor, and a memory chip.

13. The system of claim 1 wherein the composition of said label is selected from the group consisting of paper, plastic, photochromic material, thermachromic material, magnetic material, electrically conductive material, holographic material, a microprocessor, a microchip, or a memory chip.

14. The system of claim 1 wherein said label is comprised of a plurality of layers.

15. The system of claim 1 wherein said label is a bar code.

16. The system of claim 1 wherein a refund for the retail item is conditioned upon the detection of the post-purchase machine-readable indicia by the detecting device.

17. The system of claim 16 wherein said detector removes said machine-readable post-purchase indicia from said label after a refund is given to the customer.

18. The system of claim 1 wherein said machine-readable post-purchase indicia identifies the store where the retail item was sold.

19. The system of claim 1 wherein said machine-readable post-purchase indicia identifies the date and time of sale for the retail item.

20. The system of claim 1 wherein the machine-readable post-purchase indicia identifies the method of payment used to purchase the retail item.

21. A method for verifying the purchase of a retail item by a customer comprising:
    providing a label associated with the retail item, said label lacking a machine-readable post-purchase indicia;
    encoding a machine-readable post-purchase indicia associated with the label by a point of sale encoding device when the item is purchased by the customer; and upon return of said retail item analyzing said label with a detecting device to determine whether the machine-readable post-purchase indicia is present.

22. The method of claim 21 wherein a refund for the retail item is conditioned upon the detection of the post-purchase machine-readable indicia by the detecting device.

23. The method of claim 21 wherein the encoding of the post-purchase indicia produces an invisible post-purchase indicia.

24. The system of claim 1 wherein said encoding device provides the machine readable indicia when the label is scanned during purchase.

25. The system of claim 21 wherein the encoding is performed when the label is scanned during purchase.

26. The system of claim 1 wherein the post-purchase indicia is removable after the retail item is exchanged or refunded.

27. The method of claim 21 wherein the post-purchase indicia is removable after the retail item is exchanged or refunded.

28. The method of claim 21 wherein said encoding is done by radiofrequency.

29. The method of claim 21 wherein said analyzing is done by radiofrequency.

* * * * *